May 15, 1962 J. E. STARR 3,034,347
STRAIN GAUGE BRIDGE CIRCUIT ARRANGEMENT, PARTICULARLY
FOR LOAD CELLS
Filed Dec. 1, 1960
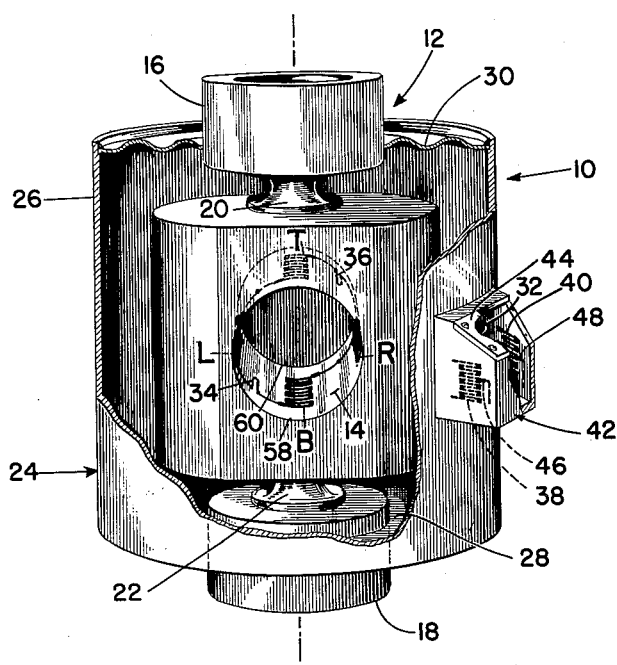
FIG. 1
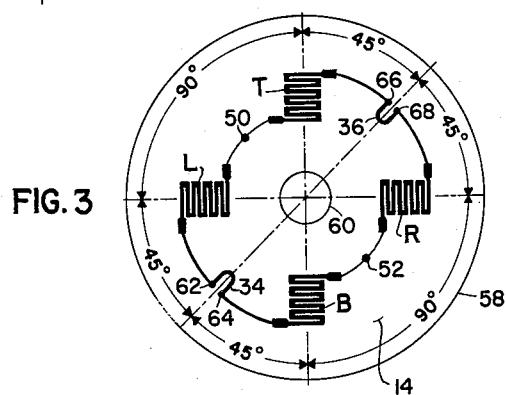
FIG. 3
FIG. 2
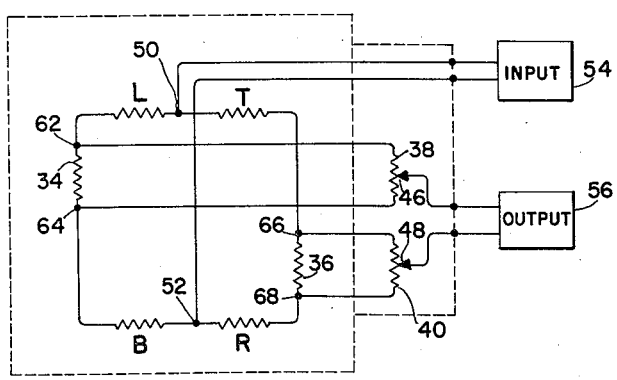
INVENTOR.
James E. Starr.
BY
ATTORNEY 3,034,347
STRAIN GAUGE BRIDGE CIRCUIT ARRANGE-
MENT, PARTICULARLY FOR LOAD CELLS
James E. Starr, Cumberland, Md., assignor to The Budd
Company, Philadelphia, Pa., a corporation of Pennsylvania
Filed Dec. 1, 1960, Ser. No. 72,989
2 Claims. (Cl. 73—141)

This invention pertains to an improved bridge circuit of the type having four arms each comprised of a strain gauge exhibiting resistance variations in accordance with imposed strain variations. More particularly, this invention pertains to improvements in such a strain gauge bridge network adapted for application to a load cell spring element where the bridge output is required to be an accurate and reproducible function of external loading forces imposed upon the spring element.

The conventional four-arm strain gauge bridge is theoretically capable of maintaining an exact balance independently of ambient temperature provided that all four arms act in an identical manner in response to temperature variations. In practice, however, it is never possible to approach this condition except by empirical adjustments of a given strain gauge bridge circuit after its application to a specific structure. Even if the several strain gauges were identical, some initial bridge unbalance and some bridge temperature dependence would result from differences in the connections which must be made from strain gauge to strain gauge in order to form the bridge network. The presence of solder joints, of slightly unequal lengths of connecting lead wires, of unavoidable changes in temperature coefficients along the lead wires, and the like, always leave some residual temperature dependence in the completed circuit. Further, variations in resistance, resistivity, and strain resistance coefficients for the bridge inter-connections can always be expected to result in a residual bridge unbalance even when no external strain is imposed upon any of the bridge strain gauges.

A common method for correcting residual temperature dependence is to insert a small resistor having a high temperature coefficient in one of the bridge arms. In order to determine the required characteristics of the temperature correcting resistor and its proper placement in the bridge, it is necessary to check the performance of the completed bridge versus temperature, to adjust the condition of the temperature correcting resistance, and then to recheck bridge response to ambient temperature variations. Whenever such a temperature correcting resistor is inserted in a bridge circuit, the balance point of the bridge will be disturbed and it is usually necessary to correct this by inserting and adjusting a second resistance which has a negligible temperature dependence in order to rebalance the bridge. It is usually necessary to repeat these several adjustments because the temperature dependence and bridge balance corrections interact. Bridge operations are affected not only by variations in bridge components but also by variations in their environment. Therefore, a load cell bridge circuit should be assembled on its spring element and hermetically sealed within its protecting enclosure during bridge adjustment procedures so that the operational environment is present during rebalancing. However, since each adjustment required access to the bridge, it was usually necessary to remove the enclosure for insertion or alteration of the correcting resistances, an obviously cumbersome and expensive operation.

Therefore, it is an object of this invention to provide an improved strain gauge bridge circuit allowing bridge temperature dependence and initial bridge balance errors to be corrected from a remote location.

The above and additional objects and advantages are secured, according to an illustrated embodiment of this invention applied to a load cell spring element, by a bridge network having four substantially similar resistance strain gauges bonded to the spring element and connected respectively in the four bridge arms, a temperature dependence correction resistor and a balance point correction resistor inserted respectively between adjacent bridge arms at opposite ends of one bridge diagonal, first and second remote shunting resistors each connected in parallel with one of the correcting resistors and each having a variable midtap, first external circuit means connected between said midtaps, and second external means connected across the other bridge diagonal, one of the external circuit means generating a bridge excitation input and the other external circuit means generating an output responsive to bridge unbalances related to spring element load strains.

The features of this invention believed to be novel are distinctly pointed out in the appended claims; however, a better understanding of the invention will be had upon consideration of the following specification taken in conjunction with the accompanying drawing wherein:

FIG. 1 illustrates application of the bridge circuit of this invention to a representative load cell;

FIG. 2 is a schematic illustration of the impedance elements of the bridge network of this invention;

FIG. 3 is an artificial perspective view of the orientation of the bridge network impedances on the gauged-strain surface of the spring element of the FIG. 1 load cell.

The load cell 10 of FIG. 1 comprises a spring element 12 generally cylindrical about a vertical load axis and apertured normally of that axis to define a cylindrical gauged-strain surface 14. Upper and lower loading members 16 and 18 and load concentrating elements 20 and 22 are aligned coaxially with spring element 12. Conventional strain gauges of the bonded and resistance-foil type T, B, L, and R are adhesively attached to gauged-strain surface 14 respectively at diametrically opposed positions along and at right angles to the load axis. It is assumed that load cell spring element 12 is properly proportioned so that all four gauges sense substantially equal load and temperature strains. However, temperature strains are of the same sign while load strains sensed by gauges T and B are opposite in sign to those sensed by gauges L and R.

A housing 24 is provided for isolation of the active load cell elements from ambient conditions and may comprise a cylinder 26 closed at the bottom by disk 28 extending between and attached to cylinder 26 and loading member 18. Axial displacement of elements 16 and 18 is decoupled from the housing 24 by employing an annular bellows 30 as the upper housing closure extending between and attached to cylinder 26 and element 16. Lead wires, not shown, from the internal bridge circuitry may be led out from housing 20 through aperture 32. After the desired internal atmosphere is provided for the spring element environment, aperture 32 may be sealed by any convenient means.

The above is what would be considered a preferred design in the load cell art if it were not for the difficulty of making bridge correction adjustments. It has been necessary, however, to utilize temporary closure means for the housing in order to allow disassembly and reassembly before and during correction procedures. According to this invention, however, additional correcting resistors 34 and 36 are included within the internal bridge circuit and cooperate with certain external elements so that bridge correction procedures may be carried out after hermetic sealing of the spring element environment. The external bridge circuit elements, shunting resistors 38 and 40, are housed in an appended junction box 42 having a readily removable cover plate 44.

The bridge circuit internal and external elements are shown schematically in FIG. 2. Strain gauges T, L, B, and R are connected in series in that order in accordance with the well known Wheatstone bridge principle that bridge unbalance is proportional to difference of resistance changes in any two adjacent arms or proportional to summation of resistance changes in any two opposite arms. According to this invention, however, correcting resistors 34 and 36 are respectively serially inserted between adjacent-arm strain gauges at opposite ends of one of the two bridge diagonals and shunting resistors 38 and 40 are connected, respectively, in parallel with the correcting resistors. Variable midtap connections 46 and 48, provided on the shunting resistors 38 and 40, define a corresponding corrected bridge diagonal. The other, uncorrected, diagonal is defined by terminals 50 and 52. Auxiliary bridge input and bridge output circuits 54 and 56 are interchangeably connectible across corrected diagonal 46—48 and uncorrected diagonal 50—52.

One of the correcting resistors, 34, is for correcting residual bridge temperature dependence and is chosen from those resistance materials which have a very high temperature coefficient of resistivity, nickel or platinum, for example. The other correcting resistor, 36, is for bridge balance point correction and is chosen from those materials which have a very low temperature coefficient of resistivity, constantan or manganin alloys, for example. Nominal impedances of correcting resistors 34 and 36 are chosen to provide for a greater correction range than is required in a given bridge circuit. Assuming a 250 ohm bridge, that is a bridge comprised of four strain gauges each having a nominal resistance of 250 ohms, the temperature correcting resistor 34 may have a nominal resistance of about .15 ohm at 75° F. and balance point correcting resistor 36, a nominal resistance of about .30 ohm. Approximately 2 ohms is usually sufficient for the resistances of shunting resistors 38 and 40.

By selection of the position of midtap 46, a controlled temperature dependence may be added to any inherent temperature dependence of the remainder of the bridge circuit. The sign and magnitude of the controlled temperature dependence depend upon the direction and magnitude of the displacement of midtap 46 from the electrical center of shunting resistor 38. Similarly, sign and magnitude of bridge balance point correction are determined by the displacement of midtap 48 from the electrical center of shunting resistor 40.

Final settings for the midtaps 46 and 48 may be determined experimentally for each load cell by temperature cycling after successive midtap adjustments. However, for the mass production of similar load cells, temperature dependance versus midtap displacement data collected for a prototype cell may be applied after but one temperature cycle has been plotted for each of the following models. Experimental data may also be used to predict the bridge balance point correction required for any initial bridge unbalance and also the additional balance correction that each temperature dependence correction will require. After temperature dependence correction has been accomplished, the required bridge balance point correction is made by adjusting the position of midtap 48 on shunting resistor 40.

It is preferable that shunting resistors 38 and 40 be of a low and stable temperature-resistivity coefficient material. However, their adjacent positions in a remote junction box 42 obviate rigorous materials specifications. The resistances of resistors 38 and 40 should be low enough so that adjustment of the midtaps 46 and 48 do not create a significant change in total bridge input and output impedances, but should be high enough so that resistance variations of their lead wires are insignificant. These conditions, however, are satisfied by the usual choice of load cell lead wires and conventional resistors. Further, it is preferable that balance correction resistor 36 be larger than temperature correction resistor 34 so that sufficient range will always be available for rebalancing after correction for temperature dependence.

FIG. 3 is an artificial perspective view of gauging surface 14 of the FIG. 1 load cell as it would appear if that surface could be stretched laterally at circular edge 58 until both edges 58 and 60 were in the same lateral plane. Strain gauges T, L, B, and R, are located at their respective angular positions on the projection. Longitudinal positions within the load cell spring element aperture are indicated by the radial positions of the gauges between edges 58 and 60. Correcting resistors 34 and 36 are located on surface 14 at the 45° low strain positions which are known to exist for a diametrically distorted cylinder.

Although positions other than those shown are possible for the correcting resistors, they should be exposed to the same environment as the active strain gauges. It is especially important that temperature dependence correcting resistor 34 sense the same temperature variations as the active portions of the strain gauge bridge circuit. The load cell housing may be filled with a silicone oil to eliminate temperature gradients, however, and the physical position of resistor 34 is then of minor consequence.

It will be realized that all of the environmentally sensitive bridge circuit elements are initially sealable within housing 24 and subjected to all significant effects of the enclosure during the remote balancing adjustments and that there is no requirement for access internally of housing 24 during such adjustments.

While there have been described what are at present considered to be the preferred embodiments of this invention, it will be obvious to those skilled in the art that various changes and modifications may be made therein without departing from the invention, and it is, therefore aimed in the appended claims to cover all such changes and modifications as fall within the true spirit and scope of the invention.

What is claimed is:

1. A load cell comprising a spring element defining a gauged-strain surface, an hermetically sealed housing encompassing said surface, and a strain gauge circuit including four substantially similar strain gauges bonded to said surface and interconnected to define a four-arm bridge network, a temperature dependence correcting resistor connected between adjacent ends of first and second of said gauges sensing strain gauge ambient temperatures and exhibiting a variable resistance in accordance with said temperature, a balance point correcting resistor connected between adjacent ends of third and fourth of said gauges and exhibiting a fixed resistance substantially independent of temperature variations, first and second variably midtapped shunting resistors each connected in parallel with one of said correcting resistors, bridge input and output means, one of said means being connected between the midtaps on said shunting resistors, and the other said means being connected between adjacent ends of said first and fourth and second and third gauges, said shunting resistors being located externally of said housing, whereby load cell balance may be corrected after hermetic sealing of said housing.

2. The load cell of claim 1 wherein the resistance of said balance point correcting resistor is greater than that of said temperature dependence correcting resistor and the resistance of each said shunting resistor is greater than the resistance of the said correcting resistor connected in parallel therewith.

References Cited in the file of this patent
UNITED STATES PATENTS

| | | |
|---|---|---|
| 2,680,376 | Shaw et al. | June 8, 1954 |
| 2,801,388 | Ruge | July 30, 1957 |
| 2,801,826 | Stavnes et al. | Aug. 6, 1957 |
| 2,867,707 | MacDonald | Jan. 6, 1959 |
| 2,927,292 | Critchley et al. | Mar. 1, 1960 |